April 12, 1938.   A. G. BILLINGTON   2,113,755
TOOL FOR PULLING INSIDE AXLE BEARING CONES
Filed Nov. 25, 1936
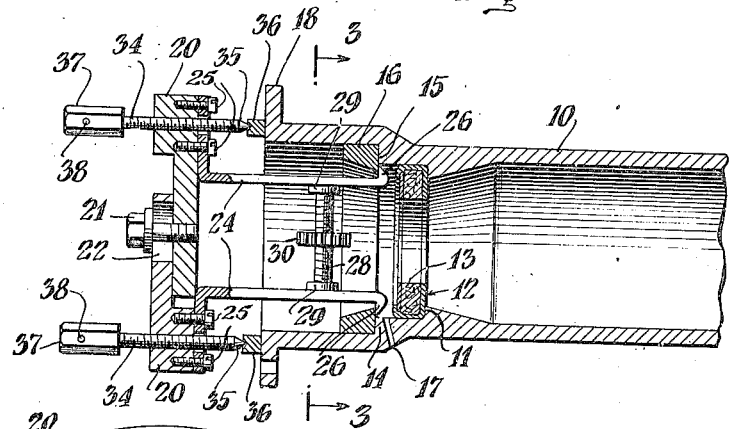
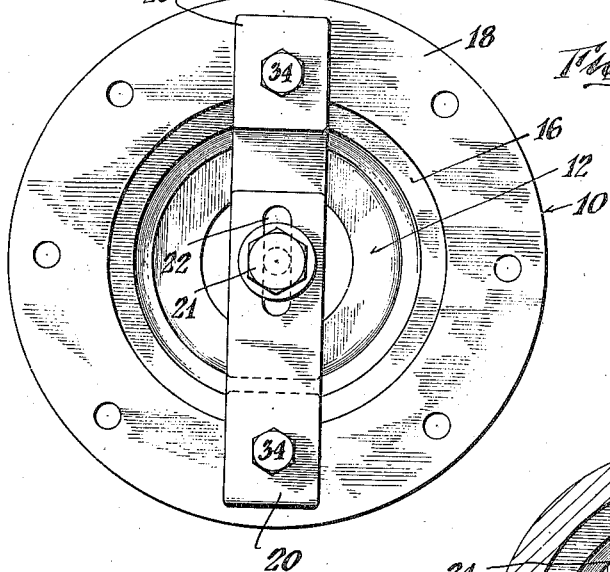
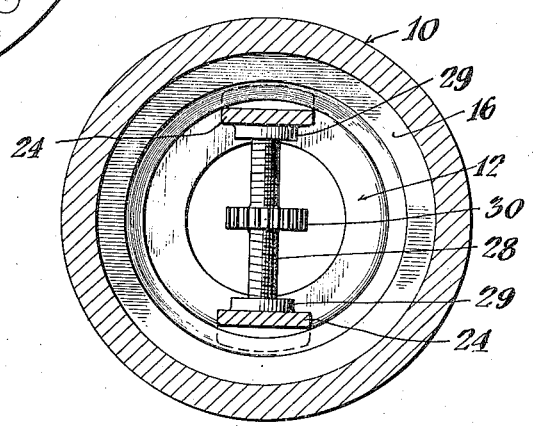
INVENTOR
Arthur G. Billington
BY
ATTORNEY Patented Apr. 12, 1938

2,113,755

UNITED STATES PATENT OFFICE 2,113,755

TOOL FOR PULLING INSIDE AXLE BEARING CONES

Arthur G. Billington, Rye, N. Y.

Application November 25, 1936, Serial No. 112,620

3 Claims. (Cl. 29—88.2)

This invention relates to a tool for removing inside annular members from a housing and more particularly to a tool for removing the inside axle bearing cones, washers or the like from the rear axle housing of an automobile.

An object of the invention is to provide a cheap, simple, convenient and dependable device for the above purpose.

Another object is to provide a tool which may be adjusted for various sizes of members.

Another object is to provide a tool capable of supplying the necessary force for removing the member without injuring the housing in which the member is seated.

Various other objects and advantages will be apparent as the nature of the invention is more fully disclosed.

A feature of the invention consists in the provision of adjustable jaws which are carried on an extensible base, adapted to permit the jaws to be collapsed for insertion inside the member and to be extended to engage the back of the member after they have been properly positioned. Screw means is carried by the base to bear against a portion of the housing for exerting the necessary thrust for removing the member. Means is also provided to prevent the screw means from injuring the housing and for providing a uniform pull on both sides of the member.

Various other features consist in the details of construction and combinations of parts hereinafter more fully set forth.

The invention is applicable to various uses, as will be understood from the following description, taken in connection with the accompanying drawing, in which a particular embodiment thereof has been shown for purposes of illustration.

In the drawing:

Fig. 1 is a longitudinal section showing the tool in position for removing the inside axle bearing cone from the rear axle housing of an automobile.

Fig. 2 is a front elevation thereof, and

Fig. 3 is a section taken along the line 3—3 of Fig. 1.

Referring to the drawing more in detail, the invention is shown as applied to the rear axle housing 10 of an automobile, from which the brake mechanism, drive shaft and bearings have been removed in the customary manner for purposes of repair or inspection. The rear axle housing 10 is of standard construction and is provided with an inside shoulder 11 against which the drive shaft oil washer 12 is seated. This drive shaft oil washer 12 is provided with packing 13 and is adapted to engage the drive shaft, not shown, for forming an oil seal to confine the lubricant used for the drive shaft bearings.

The housing 10 is provided with a bearing section 14 terminating in a second shoulder 15, against which the inside axle bearing cone 16 is positioned. An oil hole 17 is provided between the shoulder 15 and the oil washer 12, for the admission of lubricant to the bearings within the bearing section 14. A flange 18 is formed on the end of the housing 10 and is adapted to carry the brake housing and brake mechanism, not shown.

In disassembling the rear axle of an automobile for purposes of inspection or repair, it is the usual practice to first remove the wheel and drive shaft with the associated bearings and then the brake mechanism which is carried by the flange 18 of the housing 10. Thereafter it is necessary to remove the inside axle bearing cone 16. This is frequently difficult because it may have become firmly seated within the housing 10.

The tool constructed in accordance with the present invention is particularly adapted for removing this cone 16, although it is to be understood that it may be applied to other similar uses such as to the removal of the oil washer 12. The tool comprises an extensible base formed by a pair of base members 20 which are relatively slidable and are adjustably held by a screw bolt 21 threaded into one of the members 20 and extending through an elongated slot 22 in the other of said members. Each member 20 carries an arm 24 which may be secured thereto by bolts 25. The arms 24 extend at right angles to the members 20 and are formed at their ends with jaws 26 which are bent outwardly and are adapted to engage the back of the cone 16. The arms 24 are adjustable by means of a rod 28 having reverse threads at its two ends which are threaded into collars 29 formed on, or secured to, the arms 24. The rod 28 is provided with a knurled handle 30, which is adapted to be operated manually or by a tool to retract or spread the arms as may be required.

A pair of screws 34 are threaded through the base members 20 in a position with respect to the arms 24 such that they are in alignment with the flange 18 when the jaws 26 are in position for pulling the cone 16. The screws 34 are provided at their ends with points 35 which engage bearing blocks 36. These bearing blocks are adapted to rest against the flange 18 to distribute the pressure from the screws 34 so as to prevent the latter from injuring the housing. The screws 34 are provided at their outer ends with elongated nuts 37 having holes 38 formed therein, adapted to receive a tool for turning the screws.

In using this tool to remove the cone 16, the screw bolt 21 is first loosened to permit relative sliding movement of the base members 20. The arms 24 are then retracted by suitable manipulation of the knurled handle 30 sufficiently to permit the jaws 26 to pass inside of the cone 16. The arms 24 are then spread by turning the handle 30 in a reverse direction to extend the jaws 26 in back of the cone 16 as illustrated in Fig. 1. The handle 30 is actuated for this purpose by inserting the fingers past the base members 20 or by means of a suitable tool. It will be noted that as the arms 24 are extended, similar movement of the base members 20 takes place.

After the arms 20 and jaws 26 have been properly positioned, the base members 20 are clamped by tightening the screw bolt 21. The bearing blocks 36 are then positioned against the flange 18 and the screws 34 are actuated until they hold said bearing blocks in pressure engagement with said shoulder. Thereafter the screws 34 are further actuated by applying a tool to the nuts 37 or by inserting a tool in the holes 38 formed therein. Such further actuation of the screws 34 causes a force to be exerted which readily pulls the cone 16 out of the housing 10.

While the tool has been shown as made for a particular purpose, it is to be understood that it is also applicable to various other uses and may be made in other forms. For example, the screws 34 may be positioned to press against the shoulder 15 for pulling the oil washer 12 or the oil washer 12 and cone 16 may be pulled together by positioning the screws 34 against the flange 18 and engaging the washer by the jaws 26. The washer then engages the back of the cone 16 to pull the same as the pressure is applied by the screws 34. A suitable range of adjustment may be provided to permit the device to be applied to various purposes. If desired, the arms 24 may be adjustable with respect to the base members 20, so as to vary the spacing between the arms 24 and the screws 34 to suit the requirements of the particular case.

It is to be understood that the invention is not to be limited to the particular form disclosed but that various changes and modifications may be made therein, as will be apparent to a person skilled in the art. The invention is only to be limited in accordance with the following claims, when interpreted in view of the prior art.

What I claim is:

1. A tool for removing inside bearing cones and the like from a housing, comprising an extensible base formed by a pair of members, adjustable clamping means for clamping said members in various relative positions, an arm carried by each of said members extended at right angles thereto and having a jaw turned outwardly to engage the back of the cone, spreader means between said arms for controlling the extended position thereof, said spreader means comprising a member having reverse threads threaded into said arms and having an adjusting handle associated therewith, and screws threaded into said members to engage said housing for exerting a thrust thereon adapted to extract the cone.

2. A tool for removing the inside axle bearing cone from an automobile rear axle housing, said tool comprising an extensible base having a pair of members, means to adjustably clamp said members in different extended positions, an arm carried by each member and extended at right angles thereto and having outwardly extending jaws to engage the back of the cone, a member having reverse threads at its ends engaging said arms to adjust the extended position thereof, screws carried by said members and spaced with respect to said arms to engage said housing for exerting a thrust thereon adapted to extract said cone.

3. A tool for removing the inside axle bearing cone from an automobile rear axle housing, said tool comprising an extensible base having a pair of members, means to adjustably clamp said members in different extended positions, an arm carried by each member and extended at right angles thereto and having outwardly extending jaws to engage the back of the cone, a member having reverse threads at its ends engaging said arms to adjust the extended position thereof, screws carried by said members and spaced with respect to said arms to engage said housing and bearing blocks disposed between the ends of said screws and said housing to prevent injury to said housing when pressure is applied for removing said cone.

ARTHUR G. BILLINGTON.